(12) United States Patent
Ghotra et al.

(10) Patent No.: US 12,206,247 B2
(45) Date of Patent: Jan. 21, 2025

(54) OUTPUT CONTROL AND COMPENSATION FOR AC COUPLED SYSTEMS

(71) Applicant: Eguana Technologies, Calgary (CA)

(72) Inventors: Daljit Ghotra, Calgary (CA); Hoang Nguyen, Calgary (CA); Russell J. Morash, Calgary (CA); Brent E. Harris, Calgary (CA); Keith W. Johnston, Calgary (CA)

(73) Assignee: EGUANA TECHNOLOGIES, Calgary (CA)

( * ) Notice: Subject to any disclaimer, the term of this patent is extended or adjusted under 35 U.S.C. 154(b) by 0 days.

(21) Appl. No.: 17/490,464

(22) Filed: Sep. 30, 2021

(65) Prior Publication Data

US 2022/0021206 A1 Jan. 20, 2022

Related U.S. Application Data

(63) Continuation of application No. 15/426,960, filed on Feb. 7, 2017, now Pat. No. 11,139,654.
(Continued)

(51) Int. Cl.
*H02J 3/32* (2006.01)
*G05B 11/01* (2006.01)
(Continued)

(52) U.S. Cl.
CPC ............... *H02J 3/32* (2013.01); *G05B 11/01* (2013.01); *H02J 3/007* (2020.01); *H02J 3/381* (2013.01);
(Continued)

(58) Field of Classification Search
None
See application file for complete search history.

(56) References Cited

U.S. PATENT DOCUMENTS

| 5,324,990 A | 6/1994 | Cunningham |
| 5,834,132 A | 11/1998 | Hasegawa |

(Continued)

FOREIGN PATENT DOCUMENTS

| EP | 2685582 A1 | 1/2014 |
| JP | 05174964 A | 7/1993 |

(Continued)

OTHER PUBLICATIONS

European Search Report for European Patent Application No. 17155724.2, dated Jun. 14, 2017; 9 pages.
(Continued)

*Primary Examiner* — Daniel Cavallari
(74) *Attorney, Agent, or Firm* — Schwabe Williamson & Wyatt, PC

(57) ABSTRACT

A power output control and compensation (PCC) circuit operates within a distributed energy resource (DER) system. The PCC circuit is located in a battery power conversion system (PCS) and includes an input terminal to connect with a power source and an output terminal to connect with an electrical panel or load. A current sensing device is coupled between the input and the output terminals to measure a power level of the power source. A relay is coupled between the current sensing device and the output terminal and a processor selectively connects power from the power source to the electrical panel or the load based on the measured power level or based on other power measurements within the DER system. PCS-control of multiple power sources decreases cycle times for controlling distributed energy resources.

5 Claims, 7 Drawing Sheets

Related U.S. Application Data

(60) Provisional application No. 62/293,715, filed on Feb. 10, 2016.

(51) Int. Cl.
    *H02J 3/00*         (2006.01)
    *H02J 3/38*         (2006.01)
    *H02M 7/44*       (2006.01)
    *H02J 7/35*         (2006.01)
    *H02J 13/00*      (2006.01)

(52) U.S. Cl.
    CPC ............... *H02M 7/44* (2013.01); *H02J 7/35* (2013.01); *H02J 13/00028* (2020.01); *H02J 2300/24* (2020.01); *Y02E 10/56* (2013.01); *Y02E 40/70* (2013.01); *Y02E 60/00* (2013.01); *Y04S 10/123* (2013.01); *Y04S 10/14* (2013.01)

(56) References Cited

U.S. PATENT DOCUMENTS

| | | | |
|---|---|---|---|
| 7,237,134 | B2 | 6/2007 | Heberlein, Jr |
| 9,639,074 | B2 | 5/2017 | Hibiya |
| 9,654,028 | B1 | 5/2017 | Luo |
| 10,181,724 | B2 | 1/2019 | Ghotra |
| 2001/0004170 | A1 | 6/2001 | Schienbein |
| 2004/0021445 | A1 | 2/2004 | Harris |
| 2005/0088868 | A1 | 4/2005 | Ryan |
| 2008/0185999 | A1 | 8/2008 | Matsukawa |
| 2011/0304299 | A1 | 12/2011 | Yang |
| 2011/0316489 | A1 | 12/2011 | Norimatsu |
| 2012/0146587 | A1 | 6/2012 | Srinivasan |
| 2013/0106320 | A1 | 5/2013 | Yugo |
| 2014/0111137 | A1 | 4/2014 | Tanikawa |
| 2014/0217826 | A1 | 8/2014 | Oguchi |
| 2014/0239724 | A1 | 8/2014 | Ishikawa |
| 2015/0022004 | A1 | 1/2015 | Okuda |
| 2015/0249421 | A1* | 9/2015 | Hudson ............... H02J 3/381 |
| | | | 700/287 |
| 2015/0318700 | A1 | 11/2015 | Inakagata |
| 2016/0141879 | A1* | 5/2016 | Motsenbocker ......... G05F 1/67 |
| | | | 307/130 |
| 2016/0226255 | A1 | 8/2016 | Sugeno |
| 2017/0229866 | A1 | 8/2017 | Ghotra |
| 2017/0229867 | A1 | 8/2017 | Ghotra |
| 2017/0229872 | A1 | 8/2017 | Ghotra |
| 2018/0205262 | A1 | 7/2018 | Akita |
| 2018/0269685 | A1* | 9/2018 | Sugeno ............... H02S 40/32 |

FOREIGN PATENT DOCUMENTS

| | | |
|---|---|---|
| KR | 201500090371 A | 8/2015 |
| WO | 2005/091485 A1 | 9/2005 |
| WO | 2012/049910 A1 | 4/2012 |
| WO | 2013/015192 A1 | 1/2013 |
| WO | 2014/080599 A1 | 5/2014 |
| WO | 2014/112925 A1 | 7/2014 |
| WO | 2014/147294 A1 | 9/2014 |
| WO | 2015/128359 A1 | 9/2015 |

OTHER PUBLICATIONS

European Search Report for European Patent Application No. 17155738.2, dated May 19, 2017; 9 pages.

* cited by examiner

DISTRIBUTED ENERGY RESOURCE (DER) SYSTEM
(PRIOR ART)

OUTPUT CONTROL AND COMPENSATION FOR AC COUPLED SYSTEMS

The present application is a continuation of U.S. patent application Ser. No. 15/426,960 filed on Feb. 7, 2017, which claims priority to U.S. Provisional Patent Application Ser. No. 62/293,715 filed on Feb. 10, 2016, entitled: POWER CONTROL SYSTEMS, which are all incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to power output control and compensation for AC coupled systems.

BACKGROUND

Multiple distributed energy resources (DERs) are often deployed together at a single location in order to provide added system reliability, increased power capacity, or storage. An energy management system (EMS) coordinates power flow between various DERs, loads, and a power grid. The EMS may communicate with DERs throughout the power system and individually control the DERs to manage power flow and respond to varying grid conditions and external dispatch commands.

A common DER system implementation includes a solar photovoltaic (PV) generator connected with a battery energy storage system (BESS) and loads. The energy storage capability of the BESS supplements the intermittent power produced by the PV generator and provides additional capabilities such as demand response and peak shifting.

DERs may use modular designs with various types, sizes, and functions. It may be difficult or impractical to design products (e.g., PV inverters, battery systems, etc.) to manage the power flow through so many different combinations of configurable DER systems. This necessitates the use of an EMS to manage the aggregated DER system; however, the EMS used in the DER system is also hindered by communication latency, limiting the speed commands can be executed. Using the EMS for power flow control also means that any system or communication failure may compromise electrical system functionality.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A power output control and compensation (PCC) circuit operates within a distributed energy resource (DER) system. The PCC circuit is located in a battery power conversion system (PCS) and includes an input terminal to connect with a photovoltaic (PV) power system and an output terminal to connect with an electrical panel or load. A current sensing device (e.g., shunt resistor or current transducer) is coupled between the input and the output terminals to measure a power level of the PV system. A relay is coupled between the current sensing device and the output terminal and a processor selectively connects power from the PV system to the electrical panel or the load based on the measured PV power level or based on other power measurements within the DER system. PCS-control of multiple power sources decreases cycle times for controlling DERs.

Figure 1:
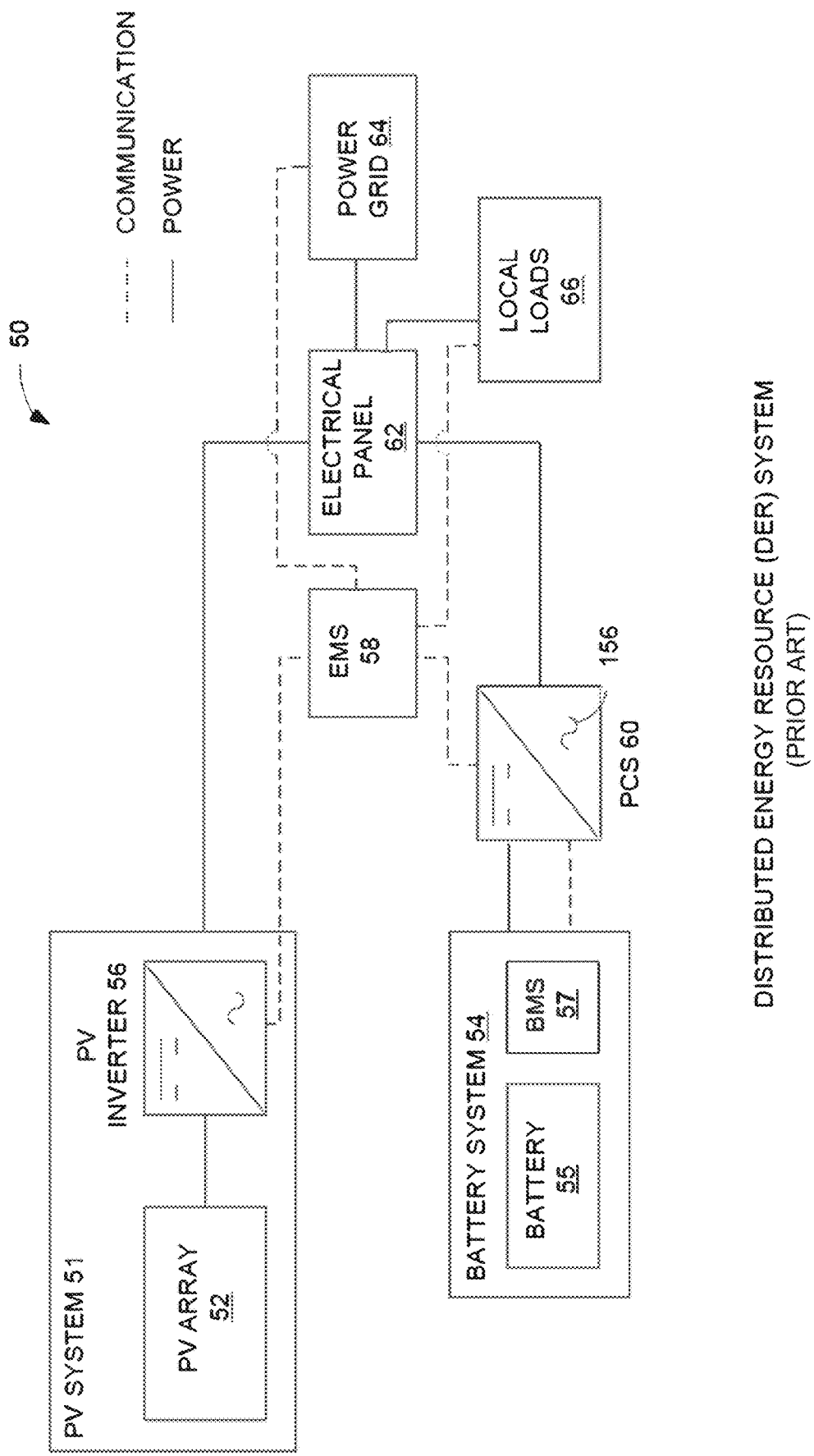
FIG. 1 shows an example distributed energy resource (DER) system (prior art).

FIG. 1 shows a known DER system configuration 50. In one example, a PV array 52 connects through a PV inverter 56 to an electrical panel 62. A battery system 54 may connect to electrical panel 62 through PCS 60. Electrical panel 62 may supply power from PV array 52 and battery system 54 to different local loads 66 and/or to a power grid 64.

PV array 52 may be any type of device capable of converting solar energy into electrical energy. In one example, PV inverter may convert direct current (DC) power from PV array 52 into alternating current (AC) power for different local AC loads 66 and/or other remote AC devices connected to power grid 64. PCS 60 also may charge battery system 54 using power supplied by PV array 52 or power grid 64 and also may convert stored DC energy in battery system 54 into AC power for powering local loads 66 and exporting power to the power grid 64.

DER system 50 may use energy management system (EMS) 58 to coordinate power flow between PV array 52, battery system 54, local loads 66, and power grid 64. EMS 58 may communicate with other energy sources throughout the power system, manage power flow within DER 50, and respond to varying grid conditions or dispatch commands.

Battery system 54 typically relies on three main components that interact with each other. These include a battery management system (BMS) 57, PCS 60, and EMS 58. BMS 57 monitors the state and condition of battery 55 and provides protection against unsafe operating states (e.g., high battery cell temperatures). BMS 57 also provides handshaking and information transfer with other power components. Battery 55 can be a single battery or multiple batteries combined within battery system 54.

PCS 60 is a linking element that enables power transfer between battery 55 and loads 66 connected to electrical panel 62. PCS 60 is designed to convert DC power from battery 55 into AC power which may be used to power local loads 66 or to export to the power grid 64. PCS 60 may be bidirectional to convert AC power from power grid 64 and/or PV array 52 into DC power for charging battery 55.

EMS 58 coordinates power flow between power grid 64, battery 55, local loads 66, and PV array 52. EMS 58 may implement algorithms to manage battery charging and discharging based upon electricity price structures such as time-of-use metering or demand charging.

PCS 60 may act as a bridge between BMS 57 and EMS 58. PCS 60 converts power demand signals from EMS 58 into real power flow between the power converter and battery 55. As a result, PCS 60 is uniquely equipped to collect detailed information about battery system 54 in real-time. PCS 60 also has access to physical and operational parameters that would not otherwise be conveyed to EMS 58. For example, PCS 60 may communicate battery temperature, instantaneous power, and state of charge to EMS 58.

PCS 60 includes a digital signal processor (DSP) that manages the switching controls within an inverter power circuit such as the step wave power converter described in U.S. Pat. Nos. 6,608,404 and 7,808,125 which are herein incorporated by reference in their entireties. These controls are based on a feedback process involving a parameter setpoint, which can be set manually by a user or set through EMS 58.

Other example inverter and bridge circuits used in PV inverter 56 and PCS 60 are described in U.S. patent applications such as U.S. Pat. Nos. 6,198,178; 8,031,495; 6,628,011; 6,765,315; 6,738,692; and 7,087,332 which are all also herein incorporated by reference in their entireties.

Battery 55 in battery system 54 may store energy output from PV array 52. A digital signal processor (DSP) 118 operating within PCS 60 may measure current and/or voltage data from both battery system 54 and PV system 51 and perform primary PCS functions in PCS 60, such as power measurements, control, and inverter system switching.

As described above, some EMSs 58 are hindered by communication latency (often several hundred milliseconds or greater), which limits the speed at which commands can be executed throughout DER system 50. Reliance on EMS 58 for all power flow control also means any system failure or communication issue may compromise electrical system functionality.

PCS-Based Output Control and Compensation

Battery 55 in battery system 54 may store energy output from PV array 52. As a result, some of the functionality for the interaction between battery system 54 and PV array 52 may be incorporated into PCS 60. Since PCS 60 controls power flow between battery system 54 and the rest of DER system 50, a PCS-based output control and compensation circuit (PCC) 102 is used in PCS 60 to also control PV/battery interactions.

Figure 2:
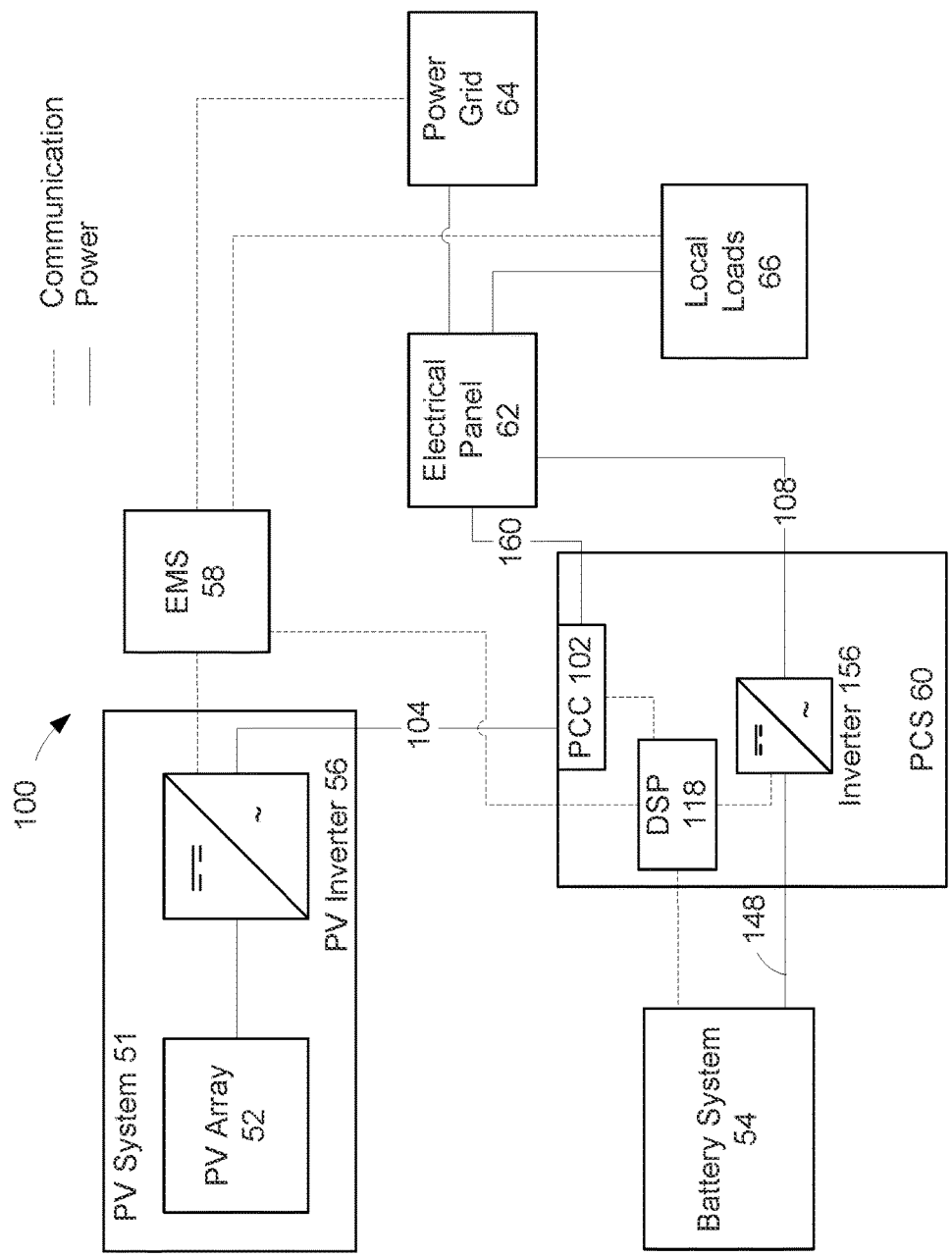
FIG. 2 shows an example DER system that uses a power output control and compensation (PCC) circuit for control of a photovoltaic (PV) system.
Figure 3:
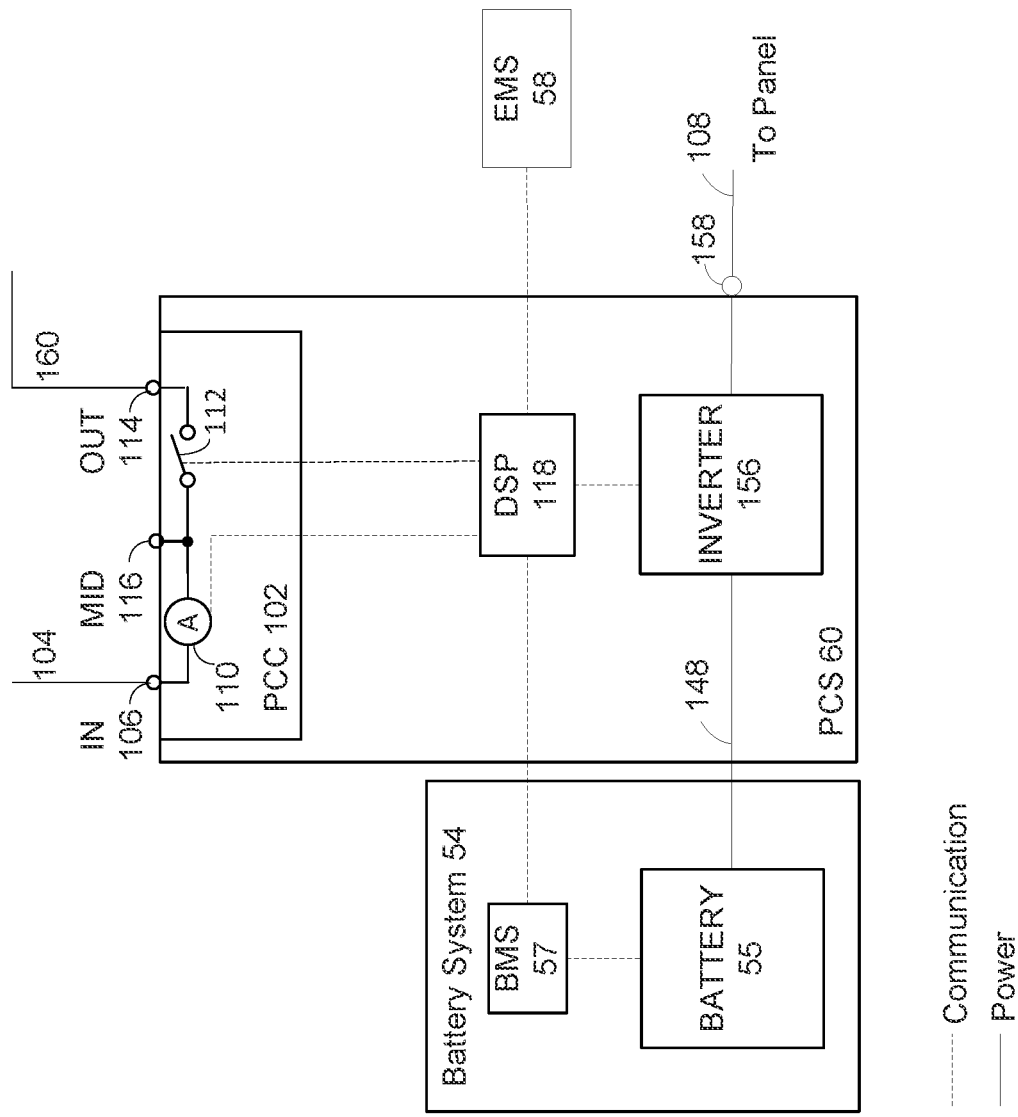
FIG. 3 shows the PCC circuit of FIG. 2.

FIG. 2 shows a DER system 100 that uses a PCC 102 based within a power conversion system (PCS) 60. FIG. 3 shows an example power PCS 60 and PCC 102 in more detail. Referring to FIGS. 2 and 3, the PCS 60 is shown comprising PCC 102, DSP 118 and inverter 156 controlled by DSP 118. The PCC 102 comprises an input terminal (IN) 106, an output terminal (OUT) 114, and an optional middle terminal (MID) 116. One leg 104 (either the line or neutral conductor) of an AC output from PV inverter 56 is connected to PCS 60 through the input terminal 106 of PCC 102. In one example, a single line or neutral conductor from the PV inverter 56 is connected through PCC 102 to electrical panel 62. The other line or neutral conductor is connected directly to electrical panel 62. In one implementation of a grid-interactive battery product, PCC 102 is located on an external circuit board that can be accessed by installers or maintenance personnel.

Power from PV inverter 56 is routed from terminal 106 through a current sensing device 110, such as a current transducer, and then through a relay 112 rated to break the PV current. Power from PV inverter 56 is routed through output terminal 114 to electrical panel 62, which also receives the power from the PCS 60 through circuit branch 160. The electrical panel contains the protection circuitry (e.g., fuse or circuit breaker) for the PV inverter 56 output circuit loop. Electrical panel 62 then interfaces with power grid 64 and local loads 66 as described above. Circuit branch 108 separately carries PCS current that is combined with the PV current from OUT 114 after reaching electrical panel 62 and being routed through the protection circuitry.

The optional MID terminal 116 is placed between current sensing device 110 and relay 112 to enable only the current sensing capability. MID terminal 116 may divert PV power passed through the current sensing device 110 to electrical panel 62 or load. In this example, MID terminal 116 may operate as OUT 114 in FIG. 2.

PCC 102 may operate independently from the remainder of the power circuitry in PCS 60. Only a single cable 104 (line or neutral) from PV inverter 56 needs to be routed to PCS 60, thus minimizing the number of terminals and simplifying cable management.

The digital signal processor (DSP) 118 measures PV current from current sensor 110 and controls relay 112. DSP 118 may receive current data from both battery system 54 and PV system 51 and perform other primary functions in PCS 60, such as power measurements, control, and inverter system switching. In this way, PCC 102 may execute some control over PV inverter 56 via power disconnection through relay 112. DSP 118 may communicate with BMS 57 in battery system 54 exchanging battery parameter data. Inverter 156 can convert DC power from battery 55 over branch 148 into AC power for feeding power grid 64 or a microgrid that supplies AC power to local loads 66. Inverter 156 has bidirectional functionality and can be used to convert AC power from power grid 64 into DC power for charging battery 55. The PCS includes terminal 158 for sending/receiving AC power via branch 108, which is coupled to electrical panel 62.

One feature of PCC 102 enables PCS 60 to control different power operations within DER system 100 rather than relying on the EMS 58. For example, DSP 118 may adjust the discharge current from battery system 54 to maintain consistent total cumulative power delivery by the combination of PV system 51 and battery storage system 54.

In one configuration, battery power output from battery system 54 is controlled according to the following equation:

$$P_{batt} = P_{net} - P_{ps} \quad (1.0)$$

Where $P_{batt}$ is the power delivered by battery system 54 through PCS 60, $P_{net}$ is the aggregated total power delivered by DER system 100 to electrical panel 62, and $P_{ps}$ is the power delivered by PV system 51.

Equation 1.0 describes an output compensation mechanism useful when grid interconnection regulations limit the net DER export to the power grid 64 below a certain level (or zero). Self-consumption protocols within certain jurisdictions (e.g., Hawaii) fall into this category. In these examples, PCC 102 may reduce the amount of power output from battery system 54 to electrical panel 62 when a total combined output power from PV system 51 and battery system 54 exceeds a power threshold limit. This is performed by responding to the dynamic power output from the PV array 52 by adjusting the power setpoint in the PCS 60. The real-time monitoring of the PV output current by the PCC 102 enables the DSP 118 to process this information and adjust the PCS 60 power setpoint with minimal latency. In this example, the DSP has information about the power draw by the local loads 66 that may be predetermined or provided by the EMS 58.

A second feature of PCC 102 is used to interrupt current from PV system 51 by opening PCS-controlled relay 112. This may enhance safety functionality. For example, if a current spike is detected on PV system 51 by a sensor monitored by DSP 118, DSP 118 may open relay 112 and interrupt power flow from PV system 51 to electrical panel 62. PCC 102 may prevent these irregular current flows from propagating into larger problems such as charge build-up (electrical hazards) or electrical fires. The disconnection of PV system 51 triggers the PV inverter 56 to disconnect because of the loss of the grid voltage reference, and the PV inverter 56 further isolates the PV array 52 from the rest of the DER system 100.

This feature may also be used to curtail PV power flow in the event that the battery system 54 cannot accommodate the required charging power. This may happen when the state-of-charge of the battery 55 has reached an upper limit and the battery system 54 cannot store additional energy from the PV system 51. This is particularly relevant if the DER system 100 is operating off-grid such that the power grid 64 is unavailable to accept excess power from the PV system 51. It is also relevant when self-consumption protocols require that PV power is not exported to the power grid 64. PV curtailment can also be used when the PV output power exceeds the electrical ratings of the circuitry in the PCS 60 or battery system 54. In either case, the curtailment relay 112 opens in response to a command from the DSP 118 based on the current detected by current sensor 110 and the additional system information available to the DSP 118. In one example, DSP 118 may operate independently of other controller circuitry operating within PCS 60.

PCC 102 may keep PV inverter 56 disconnected until PCS 60 is online and ready to respond to power setpoint commands from the DSP 118. Relay 112 may be normally-open and remain open, disconnecting PV system 51 from electrical panel 62 until PCS 60 is connected to the battery system 54 or power grid 64 and is ready to manage power flow. Thus, PCC 102 provides a system integrity check that ensures power from PV system 51 can either flow to battery system 54, local loads 66, or power grid 64 before relay 112 is closed again.

For the capabilities described above, direct control of DER system 100 by PCS 60 and PCC 102 may provide much faster response than possible through EMS 58. PCC 102 may control output compensation for PV system 51 and disconnection of PV system 51 on a step-by-step basis at the sampling frequency of DSP 118.

Figure 4:
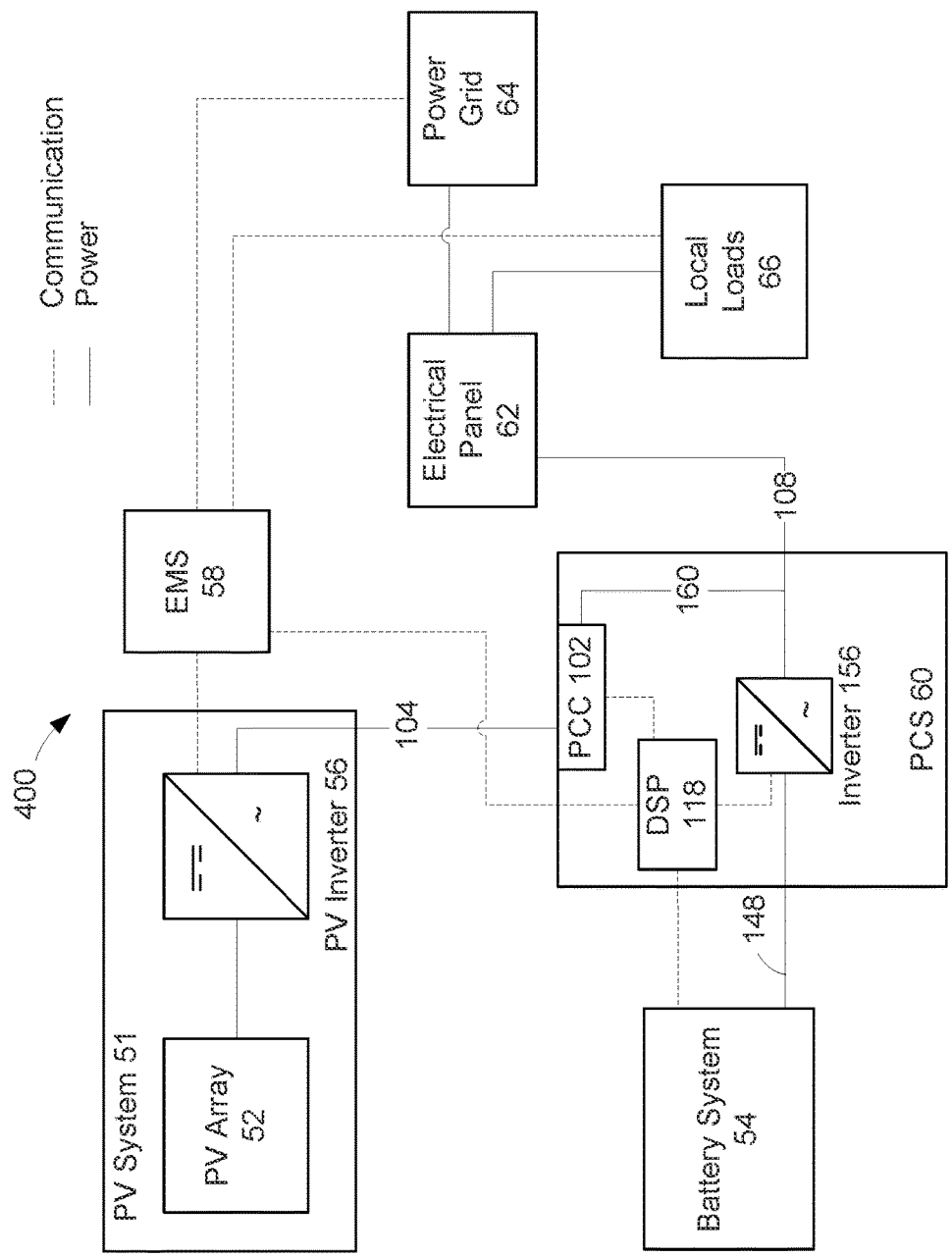
FIG. 4 shows an alternative version of the DER system that uses a PCC circuit for control of a PV system.

FIG. 4 shows another embodiment of PCC 102 of DER system 400 where the OUT terminal 114 in FIG. 3 may be routed internally to the PCS output terminal 158 such that the PV system 51 is connected to the PCS within the circuitry of the PCS 60 rather than at the electrical panel 62. This eliminates the need for two circuit branches (PCS and PV) between the PCS 60 and electrical panel 62, thereby simplifying system installation and reducing cost. In exchange, both wires from the PV inverter 56 are routed to and terminated in the PCS 60. That is, the AC output branch 104 from PV inverter 56 includes both conductors (line and neutral), and both are terminated at the PCS output terminal 108. In this example, the PV inverter AC output branch 104 may be protected by an external circuit breaker rather relying on a circuit breaker contained within the electrical panel 62.

The above examples describes a single PV system 51 coupled with a battery system 54. However, PCC 102 may operate with any combination of power sources that interact with PCS 60 through an AC coupled DER system 100. For example, a modified version of PCC 102 may connect to a specific load or may use other meters to monitor current from any alternative power source, compensate output power from PCS 60, and interrupt power flow from the alternative power source using relay 112.

Figure 5:
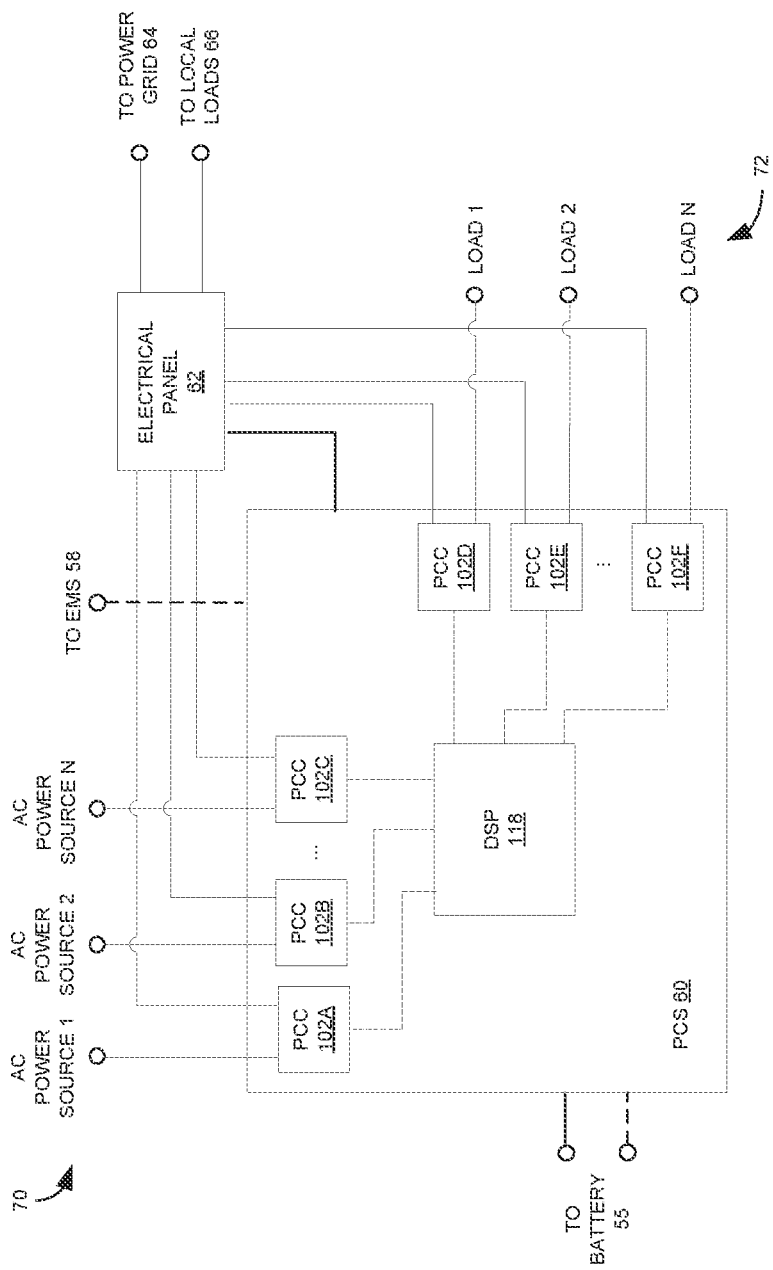
FIG. 5 shows multiple PCC circuits connected to multiple different power sources and loads.

FIG. 5 shows how multiple PCCs 102 control and compensate any number of DER power sources 70 or loads 72 operating in an AC coupled system. AC power sources 70 may include any combination of PV systems 51 or any other AC generation system. Multiple different AC branches from multiple different power sources 70 and/or loads 72 can each be connected to a separate PCCs 102 in PCS 60. For each different power source and/or load, PCCs 102 are used to monitor current, compensate output power from PCS 60, and/or interrupt power flow using relay 112 before being connected to electrical panel 62. In one example, a single line or neutral conductor from each power source 70 or load 72 is connected through an associated PCC 102 to electrical panel 62. The other line or neutral conductor is connected directly to electrical panel 62.

DSP 118 may monitor and control the connected power sources 70 and/or loads 72 connected to PCCs 102. DSP 118 may use PCCs 102 to disconnect the associated power sources 70 or loads 72 from power grid 64 or local loads 66 based on the output power of the monitored power sources 70 or loads, or based on a combination of output power from multiple monitored power sources. For example, DSP 118 may use PCCs 102 to disconnect one or more power sources 70 when the total output power reaches a power threshold limit or when a power disruption or power surge is detected in the power source. In this example, equation 1.0 must be modified as follows:

$$P_{batt} = P_{net} - \Sigma P_{ps} + \Sigma P_{load} \qquad (2.0)$$

Where $P_{batt}$ is the power delivered by battery system 54 through PCS 60, $P_{net}$ is the aggregated total power delivered by DER system 100 to electrical panel 62, $\Sigma P_{ps}$ is the total power delivered by AC power sources 70, and $\Sigma P_{load}$ is the total power delivered to loads 72.

Equation 2.0 describes an output compensation mechanism useful when grid interconnection regulations limit the net DER export to the power grid 64 below a certain level (or zero). Self-consumption protocols within certain jurisdictions (e.g., Hawaii) fall into this category. In these examples, PCC 102 may reduce the amount of power output from battery system 54 to electrical panel 62 when a total combined output power from AC power sources 70 and battery system 54 less the power delivered to loads 72 exceeds a power threshold limit. This is performed by responding to the dynamic power from the AC power sources 70 and into the loads 72 by adjusting the power setpoint in the PCS 60. The real-time monitoring of the AC power source and load currents by the PCCs 102 enables the DSP 118 to process this information and adjust the PCS 60 power setpoint with minimal latency. This embodiment is able to capture the power flow to between all power supplies 70 and loads 72 connected to the electrical panel 62, so it is possible to calculate the required power setpoint in the PCS without relying on additional information from EMS 58.

PCS-control of output power compensation decreases the cycle time for any control involving battery system 54, PV system 51, AC power sources 70, or any DER or load 66 or 72. The improved control granularity reduces the risk of set-point overshoot, improving grid stability during DER power export.

PCC 102 may try to interrupt power flow as quickly as possible to prevent system damage, personnel injury, and any other problems. Communication latency and power control response times for safety-critical functions may be reduced since PCS-controlled relay 112 bypasses EMS 58 and more closely couples power detection to power sources 51 and 70 and PCS 60. Preventing DER power flow until the battery system 54 is online further improves grid stability. PCC 102 provides significant value-added flexibility since grid interconnection requirements continue to locate more functionality within PCS 60.

Figure 6:
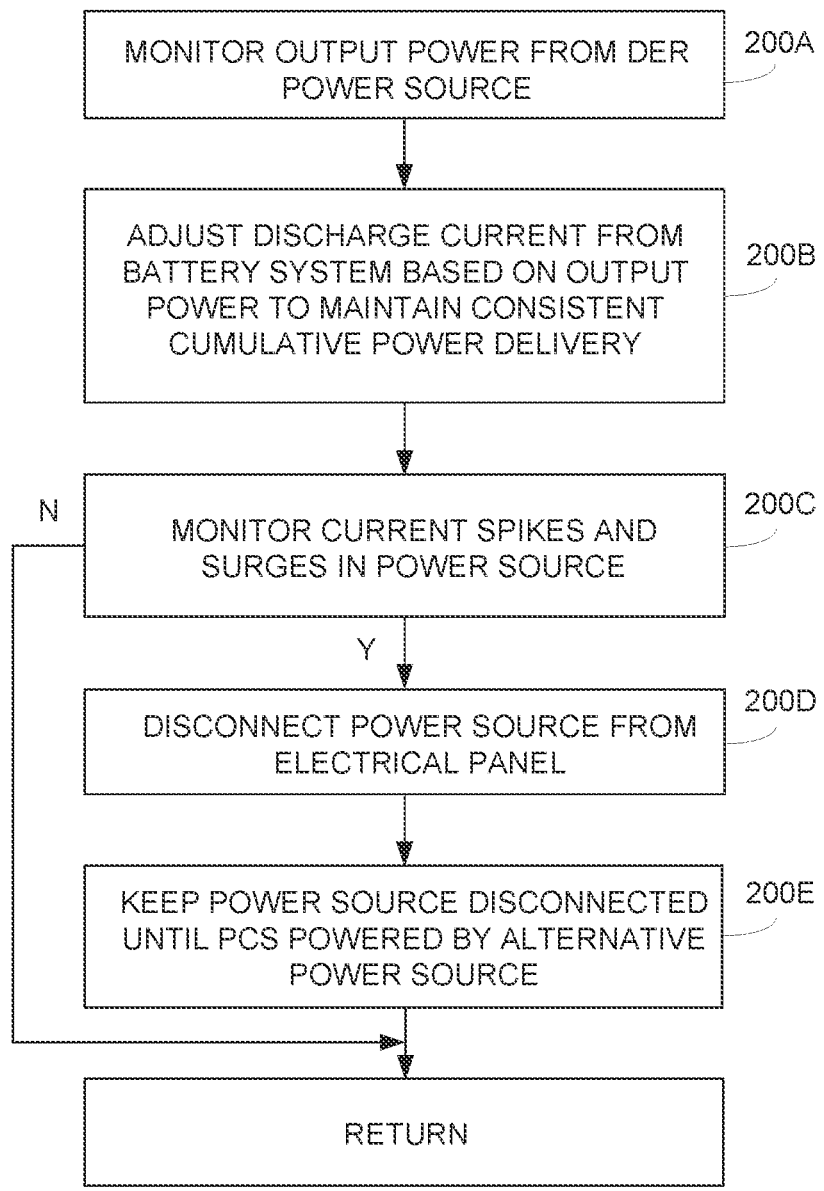
FIG. 6 shows a process performed by a PCC circuit.

FIG. 6 shows an example process performed by the DSP 118 in the PCC 102 located in the PCS 60. In operation 200A, the processor monitors the output power from the DER system 100. For example, the PCC may include a current meter connected to the DSP 118 or the DSP 118 may receive a power indication from the inverter connected to the power source.

In operation 200B, the DSP 118 adjusts the discharge current from the battery system 54 to maintain a consistent cumulative power delivery from the DER system 100. For example, the DSP 118 may reduce the discharge current from the battery system 54 when the output power from the power source increases and increase the battery discharge current when the output power decreases.

In operation 200C, the DSP 118 may monitor the power source output for current spikes, power surges, or any other irregularity. In operation 200D, the processor may disconnect the power source from the power grid and/or any loads when the power irregularity is detected. In operation 200E, the DSP 118 keeps the power source disconnected from the power grid until the PCS is powered by the battery and/or power grid and is ready to manage the power flow. For example, the PCC 102 may include a normally open relay 112 that maintains the open state until activated by the DSP 118.

Figure 7:
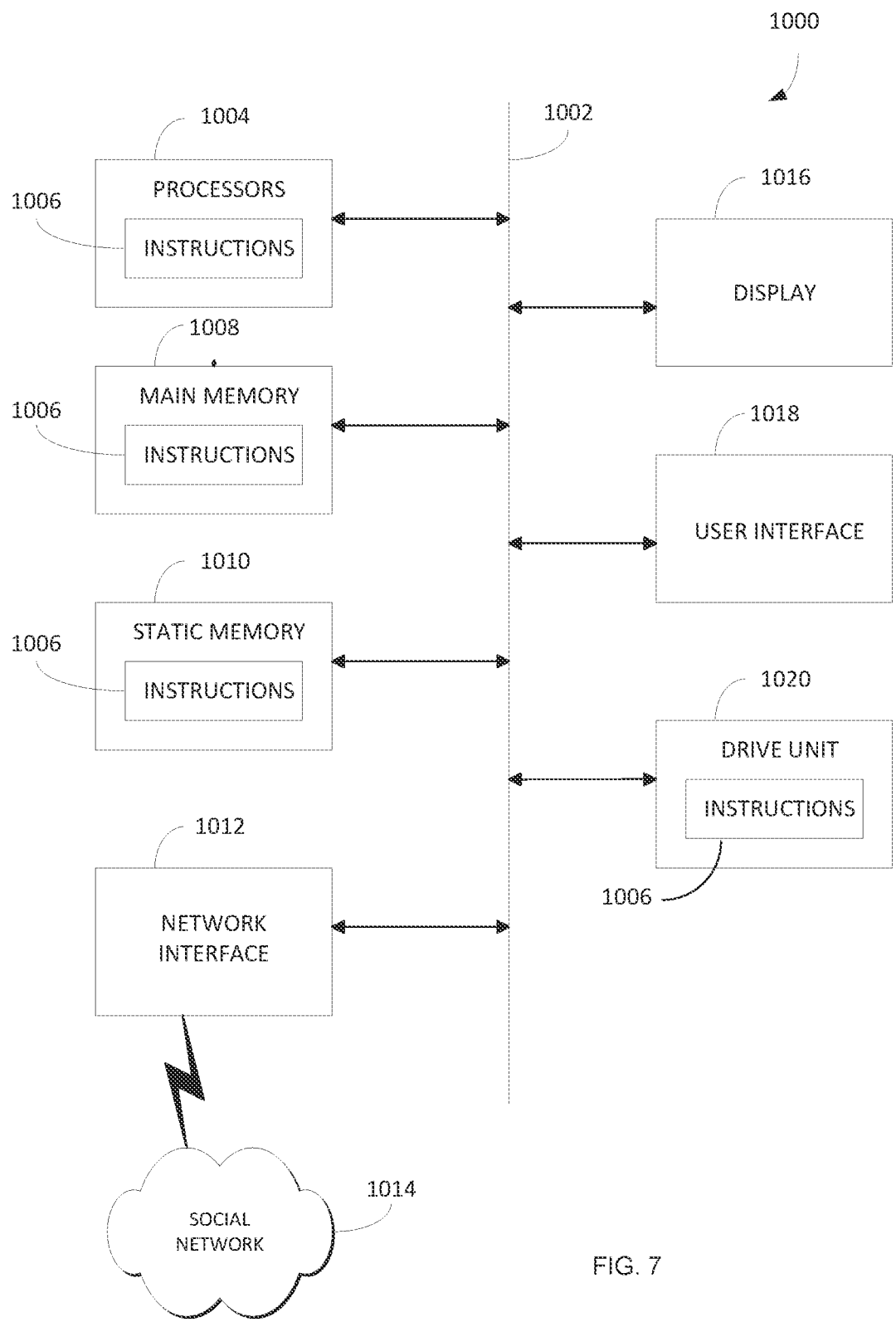
FIG. 7 shows an example computer system used in the DER system.

FIG. 7 shows a computing device 1000 that may be used for implementing or operating in combination with DSP 118, PV inverter 56, power supplies 70, PCS 60, EMS 58, and any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

The invention claimed is:

1. A system located within a battery power conversion system (PCS) for controlling output power in a distributed energy resource (DER) system, the DER system comprising: a photovoltaic (PV) system comprising a PV array and a first inverter; a battery system; and an electrical panel and a load; and an energy management system (EMS); the PCS comprising:
   a second inverter to connect with the battery system;
   a power output control (PCC) comprising:
      an input terminal to connect with the first inverter of the PV system;
      an output terminal to connect with the electrical panel;
      a current sensing device coupled between the input terminal and the output terminal; and
      a relay coupled between the current sensing device and the output terminal;
   a hardware processor coupled to the PCC; and
   memory storing one or more stored sequences of instructions which, when executed by the hardware processor, cause the hardware processor to:
      receive from the EMS power draw information about the load;
      monitor a power state for the PV system located in the DER by measuring a current from the current sensing device;
      monitor a power state for the battery system located in the DER; and
      control the relay to selectively connect the PV system to the electrical panel based on the power states of the PV system and the battery system.

2. The system of claim 1, wherein the instructions are further operable to carry out the steps of varying an amount of power discharged from the battery system based on the power states of a power source or of the battery system.

3. The system of claim 1, wherein the instructions are further operable to carry out the steps of:
   detecting a power surge state in a power source; and
      disconnecting the power source from the electrical panel or load based on the detected power source state.

4. The system of claim 1, wherein the instructions are further operable to carry out the steps of:
   controlling a combined power output by the DER system according to:

$$P_{batt} = P_{net} - P_{ps}$$

where,
$P_{batt}$ is a power output from the battery system through the PCS,
$P_{ps}$ is a power output by the power source, and
$P_{net}$ is the combined power output from a power source and the battery system.

5. The system of claim 1, wherein the instructions are further operable to carry out the steps of:
controlling a combined power output by the DER system according to:

$$P_{batt} = P_{net} - \Sigma P_{ps} \mp \Sigma P_{load},$$

where,
$P_{batt}$ is a power delivered by the battery system through the PCS, $\Sigma P_{ps}$ is a total power delivered by one or more power sources, $\Sigma P_{laod}$ is a total power delivered to one or more loads, and
$P_{net}$ is a combined total power including the power sources, the battery system, and the loads.

* * * * *